US012618722B2

(12) United States Patent
Shi et al.

(10) Patent No.: US 12,618,722 B2
(45) Date of Patent: May 5, 2026

(54) METHOD AND SYSTEM FOR TEMPERATURE MEASUREMENT OF FLUID IN PIPE, ELECTRONIC DEVICE AND STORAGE MEDIUM

(71) Applicant: Qingdao University of Technology, Qingdao City (CN)

(72) Inventors: Zhigang Shi, Qingdao City (CN); Demin Liu, Qingdao City (CN); Yandong Zhang, Qingdao City (CN); Chao Cai, Qingdao City (CN); Chuanbin Fu, Qingdao City (CN); Wenjie Liu, Qingdao City (CN); Zhichao Wang, Qingdao City (CN)

(73) Assignee: Qingdao University of Technology (CN)

( * ) Notice: Subject to any disclaimer, the term of this patent is extended or adjusted under 35 U.S.C. 154(b) by 314 days.

(21) Appl. No.: 18/598,989

(22) Filed: Mar. 7, 2024

(65) Prior Publication Data

US 2024/0302222 A1 Sep. 12, 2024

(30) Foreign Application Priority Data

Mar. 8, 2023 (CN) .......................... 202310213722.4

(51) Int. Cl.
*G01K 13/02* (2021.01)
*G01K 17/20* (2006.01)

(52) U.S. Cl.
CPC ........... *G01K 13/026* (2021.01); *G01K 17/20* (2013.01)

(58) Field of Classification Search
CPC .............................. G01K 13/026; G01K 17/20
USPC ...................................................... 374/147, 141
See application file for complete search history.

(56) References Cited

U.S. PATENT DOCUMENTS

2016/0178548 A1* 6/2016 Berry ...................... F28D 15/00
374/138

FOREIGN PATENT DOCUMENTS

| CN | 117007107 A | * | 11/2023 | ............... G01F 1/68 |
| EP | 3537124 A1 | * | 9/2019 | ............. G01K 13/02 |
| GB | 2541933 A | * | 3/2017 | ........ H01M 8/04753 |
| KR | 20240164660 A | * | 11/2024 | .......... G01M 99/002 |

* cited by examiner

*Primary Examiner* — Mirellys Jagan
(74) *Attorney, Agent, or Firm* — Onello & Mello P.C.

(57) ABSTRACT

A method and a system for temperature measurement of fluid in a pipe, an electronic device and a storage medium are provided, and relates to the technical field of temperature measurement in a pipe. The method includes: determining fixed parameters of an object to be measured, a flow rate of the fluid, a noise variance and an observation variance; determining a predicted temperature at a current moment according to an optimal internal pipe temperature and a flow rate of the fluid at a previous moment; determining a covariance at the current moment according to the noise variance and an optimal covariance at the previous moment; determining a weight coefficient at the current moment; and determining an optimal internal pipe temperature at the current moment, thereby expanding the application range of temperature measurement in a pipe.

10 Claims, 3 Drawing Sheets

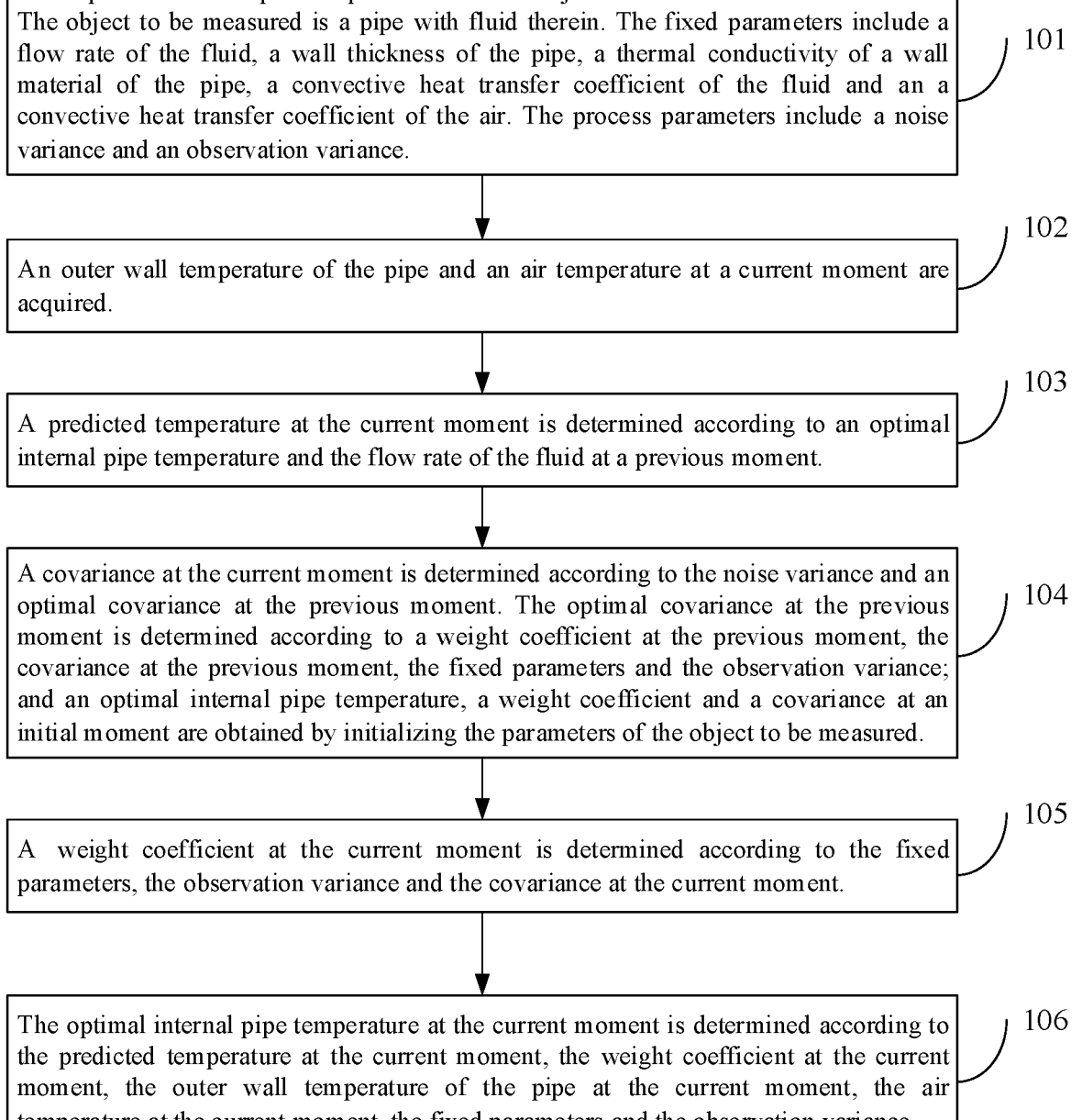

Fixed parameters and process parameters of an object to be measured are determined. The object to be measured is a pipe with fluid therein. The fixed parameters include a flow rate of the fluid, a wall thickness of the pipe, a thermal conductivity of a wall material of the pipe, a convective heat transfer coefficient of the fluid and an a convective heat transfer coefficient of the air. The process parameters include a noise variance and an observation variance.    101

An outer wall temperature of the pipe and an air temperature at a current moment are acquired.    102

A predicted temperature at the current moment is determined according to an optimal internal pipe temperature and the flow rate of the fluid at a previous moment.    103

A covariance at the current moment is determined according to the noise variance and an optimal covariance at the previous moment. The optimal covariance at the previous moment is determined according to a weight coefficient at the previous moment, the covariance at the previous moment, the fixed parameters and the observation variance; and an optimal internal pipe temperature, a weight coefficient and a covariance at an initial moment are obtained by initializing the parameters of the object to be measured.    104

A weight coefficient at the current moment is determined according to the fixed parameters, the observation variance and the covariance at the current moment.    105

The optimal internal pipe temperature at the current moment is determined according to the predicted temperature at the current moment, the weight coefficient at the current moment, the outer wall temperature of the pipe at the current moment, the air temperature at the current moment, the fixed parameters and the observation variance.    106

FIG. 1

METHOD AND SYSTEM FOR TEMPERATURE MEASUREMENT OF FLUID IN PIPE, ELECTRONIC DEVICE AND STORAGE MEDIUM

CROSS-REFERENCE TO RELATED APPLICATION

This patent application claims the benefit and priority of Chinese Patent Application No. 202310213722.4 filed with the China National Intellectual Property Administration on Mar. 8, 2023, the disclosure of which is incorporated by reference herein in its entirety as part of the present application.

TECHNICAL FIELD

The present disclosure relates to the technical field of temperature measurement in a pipe, in particular to a method and a system for temperature measurement of fluid in a pipe, an electronic device and a storage medium.

BACKGROUND

At present, most of the temperature measuring devices on the market directly measures the temperature of the surface of an object. If the temperature (such as a water supply temperature in a water supply pipe) of a working medium inside the object needs to be measured, such devices cannot measure the temperature. The current method of measuring the temperature of an internal working medium is generally to directly measure the temperature by penetrating a temperature measuring device into the object, such as a thermometer on a heating pipe. In this way, there are the following effects. First, the penetration of the thermometer increases local resistance to fluid flow and destroys an original working condition, which is very unfavorable for conditions requiring stable internal working conditions. Second, the temperature measurement can only be performed at a fixed point. If a plurality of points or even continuous temperature values are needed, it is necessary to increase instruments and thus increase the cost. Finally, it is difficult to measure the internal working medium for the built working condition, and it is obviously unrealistic to add measuring device to destroy the original structure. At the same time, when the temperature of the internal working medium is too high (such as the temperature of an internal fuel of a rocket ejector is high), it is difficult to penetrate the measuring device, so that it is difficult to perform measurement. Therefore, the existing internal temperature measurement has problems such as a device disturbing the internal working condition, the internal temperature of the object being too high to set up a device, the measuring range being limited, and the inability to perform continuously measurement, etc., thus limiting the application range of the internal temperature measurement.

SUMMARY

The present disclosure aims to provide a method and a system for temperature measurement of fluid in a pipe, an electronic device and a storage medium, which expand the application range of the internal temperature measurement.

In order to achieve the above-mentioned purpose, the present disclosure provides the following solution.

The present disclosure relates to a method for temperature measurement of fluid in a pipe, where the method includes:

determining fixed parameters and process parameters of an object to be measured; where the object to be measured is a pipe with fluid therein; the fixed parameters include a flow rate of the fluid, a wall thickness of the pipe, a thermal conductivity of a wall material of the pipe, a convective heat transfer coefficient of the fluid and a convective heat transfer coefficient of an air; the process parameters include a noise variance and an observation variance;

acquiring an air temperature and an outer wall temperature of the pipe at a current moment;

determining a predicted temperature at the current moment according to an optimal internal pipe temperature and a flow rate of the fluid at a previous moment;

determining a covariance at the current moment according to the noise variance and an optimal covariance at the previous moment, where the optimal covariance at the previous moment is determined according to a weight coefficient at the previous moment, a covariance at the previous moment, the fixed parameters and the observation variance; and an optimal internal pipe temperature, a weight coefficient and a covariance at an initial moment are obtained by initializing parameters of the object to be measured;

determining a weight coefficient at the current moment according to, the fixed parameters and the observation variance and the covariance at the current moment; and determining an optimal internal pipe temperature at the current moment according to the predicted temperature at the current moment, the weight coefficient at the current moment, the outer wall temperature of the pipe at the current moment, the air temperature at the current moment, the fixed parameters and the observation variance.

In some embodiments, a process of determining the fixed parameters specifically includes:

acquiring an inner diameter of the pipe, a thermal conductivity of the fluid, the flow rate of the fluid, a kinematic viscosity of the fluid, a thermal conductivity of the air and a length of the pipe;

calculating the convective heat transfer coefficient of the fluid according to a Prandtl coefficient, the inner diameter of the pipe, the thermal conductivity of the fluid, the flow rate of the fluid and the kinematic viscosity of the fluid; and calculating the convective heat transfer coefficient of the air according to a Grashoff criterion number, the Prandtl coefficient, the thermal conductivity of the air, the inner diameter of the pipe and the length of the pipe.

In some embodiments, the calculating the convective heat transfer coefficient of the air according to a Grashoff criterion number, the Prandtl coefficient, the thermal conductivity of the air, the inner diameter of the pipe and the length of the pipe specifically includes:

determining whether the pipe is a horizontal pipe or a vertical pipe;

determining the convective heat transfer coefficient of the air according to the Grashoff criterion number, the Prandtl coefficient, the thermal conductivity of the air and the inner diameter of the pipe when the pipe is the horizontal pipe;

determining the convective heat transfer coefficient of the air according to the Grashoff criterion number, the Prandtl coefficient, the thermal conductivity of the air and the length of the pipe when the pipe is the vertical pipe.

A system for temperature measurement of fluid in a pipe is provided, where the system includes:

a parameter determining module, configured to determine fixed parameters and process parameters of an object to be measured; where the object to be measured is a pipe with fluid therein; the fixed parameters include a flow rate of the fluid, a wall thickness of the pipe, a thermal conductivity of a wall material of the pipe, a convective heat transfer coefficient of the fluid and a convective heat transfer coefficient of an air; the process parameters include a noise variance and an observation variance;

a temperature acquiring module, configured to acquire an air temperature and an outer wall temperature of the pipe at a current moment;

a predicted temperature determining module, configured to determine a predicted temperature at the current moment according to an optimal internal pipe temperature and a flow rate of the fluid at a previous moment;

a covariance determining module, configured to determine a covariance at the current moment according to the noise variance and an optimal covariance at the previous moment, where the optimal covariance at the previous moment is determined according to a weight coefficient at the previous moment, a covariance at the previous moment, the fixed parameters and the observation variance; and an optimal internal pipe temperature, a weight coefficient and a covariance at an initial moment are obtained by initializing the parameters of the object to be measured;

a weight coefficient determining module, configured to determine the weight coefficient at the current moment according to the fixed parameters the observation variance and the covariance at the current moment; and an optimal internal pipe temperature determining module, configured to determine the optimal internal pipe temperature at the current moment according to the predicted temperature at the current moment, the weight coefficient at the current moment, the outer wall temperature of the pipe at the current moment, the air temperature at the current moment, the fixed parameters and the observation variance.

An electronic device is provided, including:

one or more processors; and a memory storage on which one or more programs are stored;

where the one or more programs, when executed by the one or more processors, cause the one or more processors to implement the method described above.

A storage medium is provided, on which a computer program is stored thereon, where the computer program, when executed by a processor, implements the method described above.

According to the specific embodiment provided by the present disclosure, the present disclosure discloses the following technical effects.

The present disclosure discloses a method and a system for temperature measurement of fluid in a pipe, an electronic device and a storage medium. Based on the measured outer wall temperature of the pipe, the temperature inside the pipe can be obtained in real time by using a Kalman filtering principle, which solves the problems existing in the existing internal temperature measurement methods such as a device disturbing the internal working condition, the internal temperature of the object being too high to set up a device, the measuring range being limited, and the inability to perform continuously measurement, etc., thereby expanding the application range of temperature measurement in a pipe.

BRIEF DESCRIPTION OF THE DRAWINGS

In order to explain the embodiments of the present disclosure or the technical solutions in the prior art more clearly, the accompanying drawings that need to be used in the embodiments will be briefly introduced hereinafter. Apparently, the accompanying drawings in the following description are only some embodiments of the present disclosure. For those ordinarily skilled in the art, other drawings can be obtained according to these drawings without creative labor.

FIG. 1 is a flowchart of a method for temperature measurement of fluid in a pipe according to Embodiment 1 of the present disclosure;

DETAILED DESCRIPTION OF THE EMBODIMENTS

The technical solutions in the embodiments of the present disclosure will be clearly and completely described with reference to the accompanying drawings in the embodiments of the present disclosure hereinafter. Apparently, the described embodiments are only some embodiments of the present disclosure, rather than all of the embodiments. Based on the embodiment of the present disclosure, all other embodiments obtained by those ordinarily skilled in the art without creative labor belong to the scope of protection of the present disclosure.

The purpose of some embodiments in the present disclosure is to provide a method and a system for temperature measurement of fluid in a pipe, an electronic device and a storage medium, aiming at expanding the application range of temperature measurement in a pipe.

In order to make the above-mentioned purpose, features and advantages of some embodiments in the present disclosure more obvious and understandable, the present disclosure will be explained in further detail with reference to the accompanying drawings and detailed description hereinafter.

Embodiment 1

Figure 2:
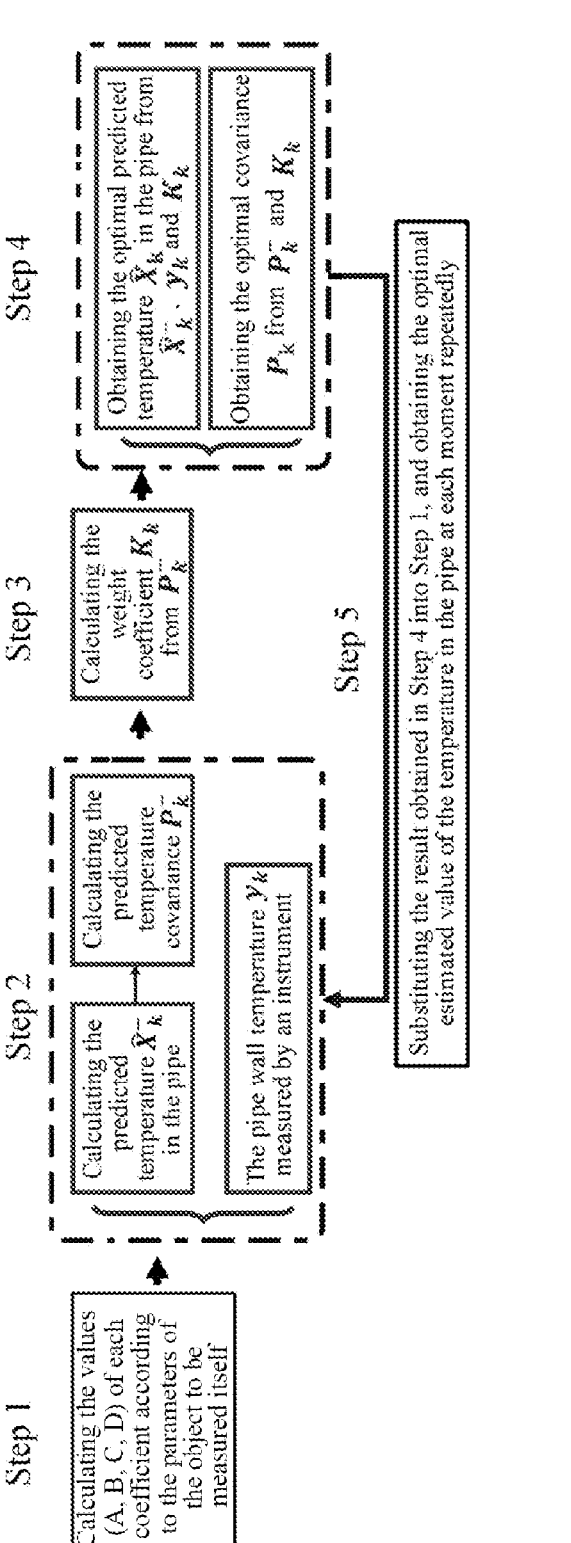
FIG. 2 is a flowchart of temperature measurement of fluid in the pipe when a current moment is k (k>1)

FIG. 1 is a flowchart of a method for temperature measurement of fluid in a pipe according to Embodiment 1 of the present disclosure. FIG. 2 is a flowchart of temperature measurement of fluid in a pipe when a current moment is k (k>1). As shown in FIG. 1 to FIG. 2, in this embodiment, a method for temperature measurement of fluid in a pipe is provided, wherein the method includes the following steps.

Step 101: fixed parameters and process parameters of an object to be measured are determined. The object to be measured is a pipe with fluid therein. The fixed parameters include a flow rate of the fluid, a wall thickness of the pipe, a thermal conductivity of a wall material of the pipe, a convective heat transfer coefficient of the fluid and a convective heat transfer coefficient of the air. The process parameters include a noise variance and an observation variance.

Step 102: an outer wall temperature of the pipe and an air temperature at a current moment are acquired.

Specifically, when the current moment is a k-th moment (k>1), the outer wall temperature $y_k$ at the k-th moment is acquired by arranging a temperature measuring instrument on the outer wall of the pipe.

The relationship between the outer wall temperature measured by the temperature measuring instrument at the k-th moment and the actual temperature xx inside the pipe at the k-th moment is as follows: $y_k=Cx_k+b$ (it is precisely because there is this relationship between the outer wall temperature measured by the temperature measuring instrument at the k-th moment and the actual temperature $x_k$ inside the pipe at the k-th moment, the temperature inside the pipe can be determined by the following calculation according to the outer wall temperature). b is the observation noise of the temperature measuring instrument that acquires the outer wall temperature. C is a first intermediate parameter, $$C = \frac{r}{r+1}, r = \frac{\frac{1}{h'}}{\frac{\delta}{\lambda_3} + \frac{1}{h}},$$

r is a second intermediate parameter. When the pipe is a horizontal pipe, $h'=h_1$. When the pipe is a vertical pipe, $h'=h_2$. $\lambda_3$ is a thermal conductivity of the wall material of the pipe. h is a convective heat transfer coefficient of the fluid, and 8 is a wall thickness of the pipe.

Specifically, when the pipe is a horizontal pipe, the calculation formula of the convective heat transfer coefficient of the air is:

$$h_1 = 0.125(Gr \cdot PrPr)^{\frac{1}{3}} \frac{\lambda_2}{l}.$$

When the pipe is a vertical pipe, the calculation formula of the convective heat transfer coefficient of the air is:

$$h_2 = 0.1(Gr \cdot PrPr)^{\frac{1}{3}} \frac{\lambda_2}{H}.$$

Where Gr is a Grashoff criterion number, Pr is a Prandtl coefficient, $\lambda_2$ is a thermal conductivity of the air, l is an inner diameter of the pipe, and H is a length of the pipe.

Step 103: a predicted temperature at the current moment is determined according to an optimal internal pipe temperature and the flow rate of the fluid at a previous moment.

Specifically, when the current moment is a k-th moment (k>1), the calculation formula of the predicted temperature $x^\hat{}_{\bar{k}}$ at the k-th moment is: $x^\hat{}_{\bar{k}}=Ax^\hat{}_{k-1}+Bu$.

Where $x^\hat{}_{\bar{k}}$ is a predicted temperature at the k-th moment, A is a matrix of 1, $x^\hat{}_{k-1}$ is an optimal internal pipe temperature at the (k−1)-th moment, B is a matrix of zero, and u is the flow rate of the fluid. The optimal internal pipe temperature at the initial moment is initialized to 0.

Step 104: a covariance at the current moment is determined according to the noise variance and an optimal covariance at the previous moment. The optimal covariance at the previous moment is determined according to a weight coefficient at the previous moment, the covariance at the previous moment, the fixed parameters and the observation variance; and an optimal internal pipe temperature, a weight coefficient and a covariance at an initial moment are obtained by initializing the parameters of the object to be measured.

Specifically, when the current moment is a k-th moment (k>1), the calculation formula of the covariance $P_{\bar{k}}$ at the k-th moment is: $P_{\bar{k}}=AP_{k-1}A^T+Q$.

Where $P_{\bar{k}}$ is a covariance at the k-th moment, $P_{k-1}$ is an optimal covariance at the (k−1)-th moment, and Q is the variance of noise, that is, the variance generated by noise.

$$P_{k-1} = (A - K_{k-1}C)P^-_{k-1}.$$

$K_{k-1}$ is a weight coefficient at the (k−1)-th moment, and $P^-_{k-1}$ is a covariance at the (k−1)-th moment. The optimal covariance at the initial moment is initialized to 1.

Step 105: a weight coefficient at the current moment is determined according to the fixed parameters, the observation variance and the covariance at the current moment.

Specifically, when the current moment is a k-th moment (k>1), the calculation formula of the weight coefficient $K_k$ at the k-th moment is:

$$K_k = \frac{P^-_k C^T}{CP^-_k C^T + R}.$$

Where $K_k$ is a weight coefficient at the k-th moment, and R is an observation variance. The observation variance is determined according to the accuracy of the temperature measuring instrument that acquires the outer wall temperature.

Step 106: the optimal internal pipe temperature at the current moment is determined according to the predicted temperature at the current moment, the weight coefficient at the current moment, the outer wall temperature of the pipe at the current moment, the air temperature at the current moment, the fixed parameters and the observation variance.

Specifically, when the current moment is a k-th moment (k>1), the calculation formula of the optimal internal pipe temperature $x^\hat{}_k$ at the k-th moment is: $x^\hat{}_k=x^\hat{}_{\bar{k}}+K_k(y_k-Cx^\hat{}_{\bar{k}})+Dz_k$.

Where $x^\hat{}_k$ is an optimal internal pipe temperature at the k-th moment, D is a third intermediate parameter, $$D = \frac{1}{r+1},$$

and $z_k$ is an air temperature at the k-th moment.

In some embodiments, a process of determining the fixed parameters specifically includes:

acquiring an inner diameter of the pipe, a thermal conductivity of the fluid, the flow rate of the fluid, a kinematic viscosity of the fluid, a thermal conductivity of the air and a length of the pipe;

calculating the convective heat transfer coefficient of the fluid according to a Prandtl coefficient, the inner diameter of the pipe, the thermal conductivity of the fluid, the flow rate of the fluid and the kinematic viscosity of the fluid; and calculating the convective heat transfer coefficient of the air according to a Grashoff criterion number, the Prandtl coefficient, the thermal conductivity of the air, the inner diameter of the pipe and the length of the pipe.

Specifically, the calculation formula of the convective heat transfer coefficient of the fluid is:

$$h = 0.023 \frac{\lambda_1}{l}.$$

Where Re is a Reynolds number, $$= \frac{ul}{v},$$

$\lambda_1$ is a thermal conductivity of the fluid, and v is a kinematic viscosity of the fluid.

In some embodiments, the calculating the convective heat transfer coefficient of the air according to a Grashoff criterion number, the Prandtl coefficient, the thermal conductivity of the air, the inner diameter of the pipe and the length of the pipe specifically includes:

determining whether the pipe is a horizontal pipe or a vertical pipe;

determining the convective heat transfer coefficient of the air according to the Grashoff criterion number, the Prandtl coefficient, the thermal conductivity of the air and the inner diameter of the pipe when the pipe is the horizontal pipe;

determining the convective heat transfer coefficient of the air according to the Grashoff criterion number, the Prandtl coefficient, the thermal conductivity of the air and the length of the pipe when the pipe is the vertical pipe.

For the problem of temperature measurement in the pipe, there are three components in total: an external temperature, an internal temperature and a flow rate of the fluid. In the actual situation, only the external temperature can be measured, but the internal temperature is expected to be obtained. Therefore, the mathematical model of the external temperature, the internal temperature and the flow rate of the fluid is established through the existing relationship, but the model and the measured results are not accurate and contain noise. Therefore, it is necessary to make the calculation and measurement of the external temperature converge with respect to each other to correct the model, so as to obtain the correct internal temperature. As in the above-mentioned method, it is crucial to determine the weight K, and the best way to find K is to use a Kalman filter.

Embodiment 2

Figure 3:
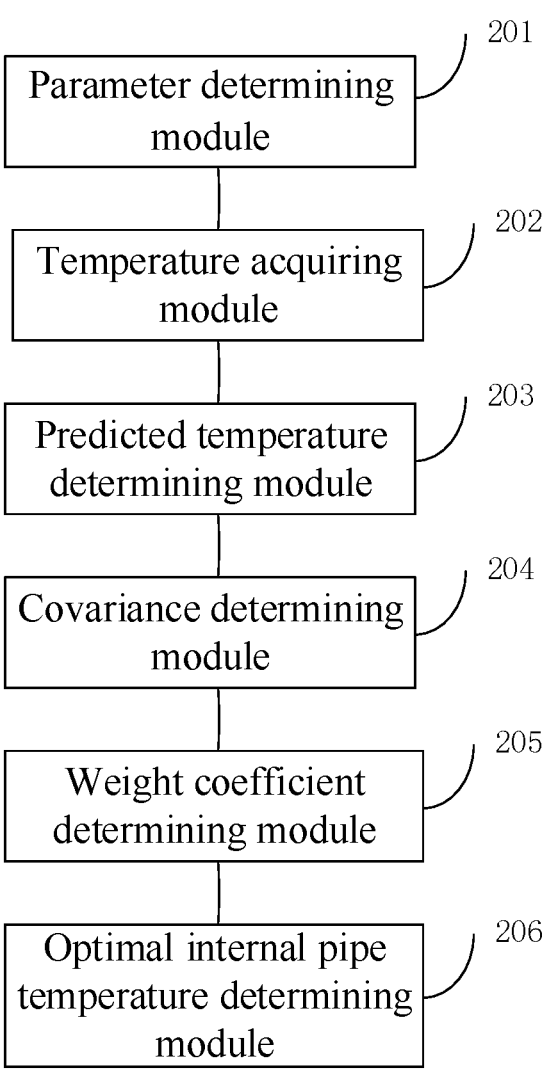
FIG. 3 is a schematic structural diagram of a system for temperature measurement of fluid in the pipe according to Embodiment 2 of the present disclosure.

FIG. 3 is a schematic structural diagram of a system for temperature measurement of fluid in a pipe according to Embodiment 2 of the present disclosure. As shown in FIG. 3, the system for temperature measurement of fluid in the pipe in this embodiment includes a parameter determining module 201, a temperature acquiring module 202, a predicted temperature determining module 203, a covariance determining module 204, a weight coefficient determining module 205 and an optimal internal pipe temperature determining module 206.

The parameter determining module 201 is configured to determine fixed parameters and process parameters of an object to be measured. The object to be measured is a pipe with fluid therein. The fixed parameters include a flow rate of the fluid, a wall thickness of the pipe, a thermal conductivity of the wall material of the pipe, a convective heat transfer coefficient of the fluid and a convective heat transfer coefficient of the air, and the process parameters include a noise variance and an observation variance.

The temperature acquiring module 202 is configured to acquire an air temperature and an outer wall temperature of the pipe at a current moment.

The predicted temperature determining module 203 is configured to determine a predicted temperature at the current moment according to an optimal internal pipe temperature and the flow rate of the fluid at a previous moment.

The covariance determining module 204 is configured to determine a covariance at the current moment according to the noise variance and an optimal covariance at the previous moment. The optimal covariance at the previous moment is determined according to a weight coefficient at the previous moment, the covariance at the previous moment, the fixed parameters and the observation variance; and an optimal internal pipe temperature, a weight coefficient and a covariance at an initial moment are obtained by initializing the parameters of the object to be measured.

The weight coefficient determining module 205 is configured to determine the weight coefficient at the current moment according to the fixed parameters, the observation variance and the covariance at the current moment.

The optimal internal pipe temperature determining module 206 is configured to determine the optimal internal pipe temperature at the current moment according to the predicted temperature at the current moment, the weight coefficient at the current moment, the outer wall temperature of the pipe at the current moment, the air temperature at the current moment, the fixed parameters and the observation variance.

Embodiment 3

An electronic device is provided, including:

one or more processors; and a memory storage on which one or more programs are stored;

where the one or more programs, when executed by the one or more processors, cause the one or more processors to implement the method for temperature measurement of fluid in the pipe as described in Embodiment 1.

Embodiment 4

A storage medium is provided, on which a computer program is stored thereon, where the computer program, when executed by a processor, implements the method for temperature measurement of fluid in the pipe as described in Embodiment 1.

In this specification, various embodiments are described in a progressive way. The differences between each embodiment and other embodiments are highlighted, and the same and similar parts of various embodiments can be referred to each other. Because the system disclosed in the embodiment corresponds to the method disclosed in the embodiment, the system is described simply, and the relevant information refers to the description of the method part.

In the present disclosure, specific examples are applied to illustrate the principle and implementation of the present disclosure, and the explanations of the above-mentioned embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A method for temperature measurement of fluid in a pipe, comprising:

determining fixed parameters and process parameters of an object to be measured; wherein the object to be measured is a pipe with fluid therein; the fixed parameters comprise a flow rate of the fluid, a wall thickness of the pipe, a thermal conductivity of a wall material of the pipe, a convective heat transfer coefficient of the fluid and a convective heat transfer coefficient of an outer air; the process parameters comprise a noise variance and an observation variance;

acquiring an outer air temperature and an outer wall temperature of the pipe at a current moment;

determining a predicted temperature at the current moment according to an optimal internal pipe temperature and a flow rate of the fluid at a previous moment;

determining a covariance at the current moment according to the noise variance and an optimal covariance at the previous moment, wherein the optimal covariance at the previous moment is determined according to a weight coefficient at the previous moment, a covariance at the previous moment, the fixed parameters and the observation variance; and an optimal internal pipe temperature, a weight coefficient and a covariance at an initial moment are obtained by initializing the parameters of the object to be measured;

determining a weight coefficient at the current moment according to the fixed parameters, the observation variance and the covariance at the current moment; and determining an optimal internal pipe fluid temperature at the current moment according to the predicted temperature at the current moment, the weight coefficient at the current moment, the outer wall temperature of the pipe at the current moment, the air temperature at the current moment, the fixed parameters and the observation variance.

2. The method according to claim 1, wherein a process for determining the fixed parameters comprises:

acquiring an inner diameter of the pipe, a thermal conductivity of the fluid, the flow rate of the fluid, a kinematic viscosity of the fluid, a thermal conductivity of the air and a length of the pipe;

calculating the convective heat transfer coefficient of the fluid according to a Prandtl coefficient, the inner diameter of the pipe, the thermal conductivity of the fluid, the flow rate of the fluid and the kinematic viscosity of the fluid; and calculating the convective heat transfer coefficient of the air according to a Grashoff criterion number, the Prandtl coefficient, the thermal conductivity of the air, the inner diameter of the pipe and the length of the pipe.

3. The method according to claim 2, wherein the calculating the convective heat transfer coefficient of the air according to the Grashoff criterion number, the Prandtl coefficient, the thermal conductivity of the air, the inner diameter of the pipe and the length of the pipe comprises:

determining whether the pipe is a horizontal pipe or a vertical pipe;

determining the convective heat transfer coefficient of the air according to the Grashoff criterion number, the Prandtl coefficient, the thermal conductivity of the air and the inner diameter of the pipe when the pipe is the horizontal pipe; and determining the convective heat transfer coefficient of the air according to the Grashoff criterion number, the Prandtl coefficient, the thermal conductivity of the air and the length of the pipe when the pipe is the vertical pipe.

4. An electronic device, comprising: one or more processors; and a memory storage on which one or more programs are stored;

wherein the one or more programs, when executed by the one or more processors, cause the one or more processors to implement the method for temperature measurement of fluid in the pipe according to claim 1.

5. The electronic device according to claim 4, wherein a process for determining the fixed parameters comprises:

acquiring an inner diameter of the pipe, a thermal conductivity of the fluid, the flow rate of the fluid, a kinematic viscosity of the fluid, a thermal conductivity of the air and a length of the pipe;

calculating the convective heat transfer coefficient of the fluid according to a Prandtl coefficient, the inner diameter of the pipe, the thermal conductivity of the fluid, the flow rate of the fluid and the kinematic viscosity of the fluid; and calculating the convective heat transfer coefficient of the air according to a Grashoff criterion number, the Prandtl coefficient, the thermal conductivity of the air, the inner diameter of the pipe and the length of the pipe.

6. The electronic device according to claim 5, wherein the calculating the convective heat transfer coefficient of the air according to the Grashoff criterion number, the Prandtl coefficient, the thermal conductivity of the air, the inner diameter of the pipe and the length of the pipe comprises:

determining whether the pipe is a horizontal pipe or a vertical pipe;

determining the convective heat transfer coefficient of the air according to the Grashoff criterion number, the Prandtl coefficient, the thermal conductivity of the air and the inner diameter of the pipe when the pipe is the horizontal pipe; and determining the convective heat transfer coefficient of the air according to the Grashoff criterion number, the Prandtl coefficient, the thermal conductivity of the air and the length of the pipe when the pipe is the vertical pipe.

7. A storage medium on which a computer program is stored thereon, wherein the computer program, when executed by a processor, implements the method for temperature measurement of fluid in the pipe according to claim 1.

8. The storage medium according to claim 7, wherein a process for determining the fixed parameters comprises:

acquiring an inner diameter of the pipe, a thermal conductivity of the fluid, the flow rate of the fluid, a kinematic viscosity of the fluid, a thermal conductivity of the air and a length of the pipe;

calculating the convective heat transfer coefficient of the fluid according to a Prandtl coefficient, the inner diameter of the pipe, the thermal conductivity of the fluid, the flow rate of the fluid and the kinematic viscosity of the fluid; and calculating the convective heat transfer coefficient of the air according to a Grashoff criterion number, the Prandtl coefficient, the thermal conductivity of the air, the inner diameter of the pipe and the length of the pipe.

9. The storage medium according to claim 8, wherein the calculating the convective heat transfer coefficient of the air according to the Grashoff criterion number, the Prandtl coefficient, the thermal conductivity of the air, the inner diameter of the pipe and the length of the pipe comprises:

determining whether the pipe is a horizontal pipe or a vertical pipe;

determining the convective heat transfer coefficient of the air according to the Grashoff criterion number, the Prandtl coefficient, the thermal conductivity of the air and the inner diameter of the pipe when the pipe is the horizontal pipe; and determining the convective heat transfer coefficient of the air according to the Grashoff criterion number, the Prandtl coefficient, the thermal conductivity of the air and the length of the pipe when the pipe is the vertical pipe.

10. A system for temperature measurement of fluid in a pipe, wherein the system comprises:

a parameter determining module, configured to determine fixed parameters and process parameters of an object to be measured; wherein the object to be measured is a pipe with fluid therein; the fixed parameters comprise a flow rate of the fluid, a wall thickness of the pipe, a thermal conductivity of a wall material of the pipe, a convective heat transfer coefficient of the fluid and a convective heat transfer coefficient of an outer air; and the process parameters comprise a noise variance and an observation variance;

a temperature acquiring module configured to acquire an outer air temperature and an outer wall temperature of the pipe at a current moment;

a predicted temperature determining module, configured to determine a predicted temperature at the current moment according to an optimal internal pipe temperature and a flow rate of the fluid at a previous moment;

a covariance determining module configured to determine a covariance at the current moment according to the noise variance and an optimal covariance at the previous moment, wherein the optimal covariance at the previous moment is determined according to a weight coefficient at the previous moment, a covariance at the previous moment, the fixed parameters and the observation variance; and an optimal internal pipe temperature, a weight coefficient and a covariance at an initial moment are obtained by initializing the parameters of the object to be measured;

a weight coefficient determining module configured to determine the weight coefficient at the current moment according to the fixed parameters, the observation variance and the covariance at the current moment; and an optimal internal pipe fluid temperature determining module, configured to determine the optimal internal pipe fluid temperature at the current moment according to the predicted temperature at the current moment, the weight coefficient at the current moment, the outer wall temperature of the pipe at the current moment, the air temperature at the current moment, the fixed parameters and the observation variance.

* * * * *